United States Patent [19]

Tsuchiya et al.

[11] 4,385,149

[45] May 24, 1983

[54] OFFSET PRINTING INK COMPOSITION

[75] Inventors: Shozo Tsuchiya, Tokyo; Makoto Sasaki; Hideo Hayashi, both of Yokohama, all of Japan

[73] Assignee: Nippon Oil Company, Limited, Tokyo, Japan

[21] Appl. No.: 290,287

[22] Filed: Aug. 6, 1981

[30] Foreign Application Priority Data

Aug. 18, 1980 [JP] Japan .................. 55-112750

[51] Int. Cl.$^3$ ............................................. C09D 11/10
[52] U.S. Cl. ................................. 524/313; 106/20; 106/27; 106/28; 260/DIG. 38; 524/481; 524/487; 524/509; 525/143
[58] Field of Search .... 260/23.7 C, 19 UA, DIG. 38; 106/20, 27, 28; 524/313, 509, 487, 481; 525/143

[56] References Cited

U.S. PATENT DOCUMENTS 2,608,550 8/1952 Rowland et al. .......... 260/23.7 C
3,084,147 4/1963 Wilks .......................... 260/23 XA

FOREIGN PATENT DOCUMENTS 3000505 7/1980 Fed. Rep. of Germany ... 260/DIG. 38
2041380 9/1980 United Kingdom ....... 260/DIG. 38

*Primary Examiner*—Ronald W. Griffin
*Attorney, Agent, or Firm*—Jordan and Hamburg

[57] ABSTRACT

An offset printing ink composition is provided which contains a vehicle resin (III) prepared by reacting 5 to 100 parts by weight of a phenolic resin (component D) with 100 parts by weight of a modified resin (II) modified with an acid, said phenolic resin (component D) being prepared by the condensation of a phenol including an alkyl substituent group having 4 to 9 carbon atoms with formalin, said modified resin (II) modified with an acid being prepared by reacting 1 to 15 parts by weight of a component C selected from the group consisting of unsaturated carboxylic acids, unsaturated carboxylic acid anhydrides and mixtures thereof with 100 parts by weight of a resin (I) obtained by copolymerizing 5 to 50 parts by weight of a component B selected from the group consisting of drying oils, fatty acids and mixtures thereof with 100 parts by weight of a five-member cyclic compound (component A) having a conjugated double bond or bonds and a Diels-Alder addition product thereof, such as cyclopentadiene or dicyclopentadiene.

15 Claims, No Drawings

OFFSET PRINTING INK COMPOSITION

BACKGROUND OF THE INVENTION

1. Field of the Invention

This invention relates to an offset printing ink composition.

2. Prior Art

Relief printing processes, lithographic printing processes including an offset printing process, and gravure printing processes have been widely used for preparing general printing matters. In the offset printing process, the inked image is once transferred from a print roller to a rubber blanket, and then printed on a sheet of paper. The print roller has a surface composed of hydrophilic portions (non-image portions) containing water and repelling oily ink and ink-holding portions (image portions) containing oil ink and repelling water. The most widely used offset printing inks are resin varnishes containing resins, such as alkylphenol resins, phenolic resins modified with rosin or maleic acid resins, which are dissolved in drying oils such as linseed oil. The phenolic resins modified with rosin are the most commonly used resins. Although a printing ink vehicle composed of a phenolic resin modified with rosin, a solvent and/or a drying oil is excellent in quality, it has disadvantages in that it is expensive and contains rosin which is a material of natural origin and unstable in supply. In place of the phenolic resin modified with rosin, it has been proposed to use so-called petroleum resins synthesized by polymerizing cracked oil fractions obtained as the by-products of petroleum or petrochemical industries. Although these petroleum resins have advantages that the supply and cost thereof are stable, the qualities thereof are not satisfactory when used as the vehicle resins for the printing inks.

The principal properties, i.e. printability, required for the printing ink, particularly when used for an offset printing ink, are as follows:

(1) The ink must have an appropriate fluidity represented by the viscosity and the yield value.
(2) A good balance should be retained at the interface between the hydrophilic portion and the ink-holding portion so as to form an image on a plane over which water and an ink contact with each other.
(3) A pigment must be uniformly dispersed in the ink.
(4) The printed face has a beautiful gloss and uniform printed matters are obtainable.
(5) The time required for setting or drying is short and the ink does not suffer blocking.
(6) The printed face has a resistance against friction.

In order to prepare an offset printing ink satisfying the aforementioned properties, the resin used therein must satisfy the following requirements.

(1) It must have a high softening point but it should not have high molecular weight.
(2) It must have a polar group to improve dispersibility of a pigment, namely it must have a polar group which has a good affinity with a pigment.
(3) It must be easily soluble in a hydrocarbon solvent which has a high boiling point and contains only a small amount of an aromatic compound.
(4) It must have a sufficient solubility in a drying oil, such as linseed oil.

Particularly, with the development of printing technology in recent years, it is required to increase the printing speed. In reply to this requirement, the offset rotary printing process is increasingly used. In the offset rotary printing process wherein the ink is heated to dryness, it is eagerly desired to use a high boiling point hydrocarbon solvent, such as a paraffin solvent, which contains an aromatic compound in an amount as small as possible, preferably no aromatic compound, to improve the environment at the working sites and to exclude the pollution problem caused by the exhaust gases. However, there has not yet been developed an offset printing ink having a satisfactory printability, as described above. Accordingly, there is an increasing demand for an offset printing ink having a satisfactory printability.

It has been already known from U.S. Pat. No. 3,084,147 that a resin soluble in a hydrocarbon solvent, such as benzene, toluene, xylene, cyclohexane or isooctane, can be prepared by thermally polymerizing cyclopentadiene at a high temperature of from 250° to 350° C. in the presence of an inert hydrocarbon solvent, such as benzene, toluene, xylenene or isooctane. The dicyclopentadiene resin prepared by this known method is soluble in a hydrocarbon solvent including benzene, toluene, xylene, solvent naphtha and Solvent No. 5 (Trade name produced by Nippon Oil, Co., Ltd.). However, since this dicyclopentadiene resin has no polar group, it cannot be applied for a variety of uses due to its poor miscibility and poor adhesive property to other materials. An ink prepared by adding various solvents and pigments to the aforementioned resin cannot be used as an offset printing ink, since the dispersibility of pigments in the ink is unsatisfactory, leading to uneven printed face having bad gloss.

Another proposal has been made by Japanese Patent Provisional Publication No. 24405/1972, wherein an acrylic ester or maleic acid anhydride is added to said dicyclopentadiene resin followed by hydrolysis to prepare a carboxylic acid-containing resin, which is then reacted with a polyhydric alcohol and a higher unsaturated carboxylic acid to produce a resin for printing inks. However, the resin prepared in accordance with this proposal and having a high softening point to give an offset printing ink to be set and dried within a time substantially equal to that required for setting and drying the conventional offset printing inks, is gotten poor in solubility in a hydrocarbon solvent originated from petroleum which is used as the solvent for the offset printing ink. As the results, the fluidity of the ink prepared therefrom is gotten poor and the gloss of the ink becomes extremely worse. A further disadvantage of this resin is that it forms gels in the step of the preparation of a varnish to give a cloudy varnish having a bad hue. On the contrary, the softening point of this resin must be lowered to improve the solubility in the solvent, resulting in prolongation of time required for setting and drying. For the aforementioned reasons, the resin prepared in accordance with the prior proposal cannot be used in an offset printing ink for practical use.

Alternatively, U.S. Pat. No. 2,608,550 discloses a resin prepared by thermally copolymerizing dicyclopentadiene and maleic acid anhydride. However, the resin taught by this prior Patent and having a relatively low content of maleic acid has, generally, an inconveniently high softening point and is poor in dispersibility of pigments and also poor in miscibility with other filler materials. If the content of maleic acid anhydride is increased to overcome the aforementioned disadvantages, there appears a tendency of coloring and gellation and the resultant resin becomes poor in weatherproof property.

U.S. Pat. No. 2,608,550 also discloses an alkyd resin produced from a so-called alkyd composition including a polybasic acid component consisting of a resin prepared by thermally polymerizing dicyclopentadiene with maleic acid anhydride. However, the alkyd resins taught by this prior patent have, in general, high molecular weights, poor solubilities in high boiling point hydrocarbon solvents for the printing inks and in drying oils. As the results, a printing ink prepared from any of these alkyd resins is poor in fluidity, inferior in gloss of the printed matters, and tends to scatter in the form of mists from the print roller to stain papers, resulting in serious misting problem. For these reasons, the alkyd resins taught by the prior Patent referred to hereinabove cannot be applied for practical use.

Although a drying oil, such as linseed oil, has been used in the conventional offset printing ink varnish, the used quantity thereof tends to be decreased with the increase in printing speed to obviate the problems of stain of the ground region caused by the use of a drying oil and to obviate occurrence of misting and retardation of setting.

The conventional offset printing ink varnish coprises a high boiling point hydrocarbon solvent, an oily component such as a drying oil, and a binder resin. As the binder resin for this purpose, alkylphenol resins, phenolic resins modified with rosin and maleic acid resins have been conventionally used. However, a varnish composition containing a decreased amount of a drying oil does not give glossy and beautiful printed matters even when any of the known binder resins is added.

In addition, any of the known resins is far from satisfactory in solubility in a paraffin solvent, so that they are almost useless as the binder resins in offset printing inks dissolved in paraffin solvents.

OBJECTS AND SUMMARY OF THE INVENTION

An object of this invention is to provide an offset printing ink composition which gives uniform printed matters having printed surfaces of beautiful gloss.

Another object of this invention is to provide an offset printing ink composition which is set and dried for a short period of time and does not suffer blocking.

A further object of this invention is to provide an offset printing ink composition which is improved in emulsifying property thereof and does not cause the misting problem.

A still further object of this invention is to provide an offset printing ink composition having an appropriate fluidity.

Another object of this invention is to provide an offset printing ink composition which is excellent in interfacial balance at the interfaces between the hydrophilic portions and the ink-holding portions.

Another object of this invention is to provide an offset printing ink composition which does not form gels or become cloudy in the step of the preparation of a varnish to give an ink varnish having a good hue.

Another object of this invention is to provide an offset printing ink composition containing a vehicle resin which has a good solubility in a high boiling point hydrocarbon solvent for the ink and in a drying oil.

Another object of this invention is to provide an offset printing ink composition containing a vehicle resin which is soluble in a paraffin solvent and has an excellent printability.

Another object of this invention is to provide an offset printing ink composition containing a vehicle resin which achieves an excellent printability even with the addition of relatively small amount of a drying oil.

The above and other objects of the invention and the advantageous features thereof will become apparent from the following detailed description.

Specifically, the offset printing ink composition provided by this invention contains a vehicle resin (III) prepared by reacting 5 to 100 parts by weight of a phenolic resin (component D) with 100 parts by weight of a modified resin (II) modified with an acid, said phenolic resin (component D) being prepared by the condensation of a phenol including an alkyl substituent group having 4 to 9 carbon atoms with formalin, said modified resin (II) modified with an acid being prepared by reacting 1 to 15 parts by weight of a component C selected from the group consisting of unsaturated carboxylic acids, unsaturated carboxylic acid anhydrides and mixtures thereof with 100 parts by weight of a resin (I) obtained by copolymerizing 5 to 50 parts by weight of a component B selected from the group consisting of drying oils, fatty acids and mixtures thereof with 100 parts by weight of a five-member cyclic compound (component A) having a conjugated double bond or bonds and represented by the general formula of:

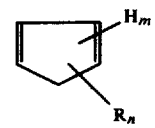

(wherein H is hydrogen: R is an alkyl group having 1 to 3 carbon atoms; m and n are zero or integers of not less than 1 and are in the relation of $m+n=6$) and/or a Diels Alder addition product thereof.

DESCRIPTION OF THE INVENTION

The present invention will now be described more specifically.

In the composition of this invention, as the component (A), used is a five-member cyclic compound having a conjugated double bond or bonds and/or a Diels-Alder addition product thereof represented by the following general formula of:

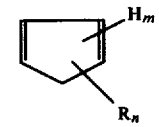

(wherein H is hydrogen;R is an alkyl group having 1 to 3 carbon atoms; m and n are zero or integers of not less than 1 and are in the relation of $m+n=6$)

Specific examples of the five-member cyclic compounds which may be preferably used on an industrial scale include cyclopentadiene and methylcyclopentadiene, and the examples of preferable Diels-Alder addition product include dicyclopentadiene, cyclopentadiene-methylcyclopentadiene codimer and tricyclopentadiene. Mixture of the aforementioned compounds may be also used preferably. Amongst them, cyclopentadiene, dicyclopentadiene and a mixture thereof are the most preferred.

It is not essential that the purity of the component (A) should be high. However, it is preferred that 80 wt.% or more of cyclopentadiene, dicyclopentadiene or an alkyl-substituted derivative thereof is present in the starting material. For example, it may be possible to use a concentrated fraction obtained by thermally dimerizing cyclopentadiene and/or methylcyclopentadiene contained in a $C_5$ fraction produced by cracking naphtha at a high temperature to obtain a mixture of dicyclopentadiene, dimethylcyclopentadiene, cyclopentadiene-methylcyclopentadiene codimer, cyclopentadiene-isoprene codimer and cyclopentadiene-piperylene codimer, followed by removing the major part of $C_5$ fractions such as $C_5$ olefins and $C_5$ paraffins by means of distillation.

Further, the component (A) may contain an additional unsaturated compound, particularly unsaturated aromatic compound, in an amount less than that of the five-member cyclic compound and or/the Diels-Alder addition product thereof. For example, styrene, α-methylstyrene, vinyltoluene, indene, methylindene and mixtures thereof may be used as the additional unsaturated compound, and the so-called $C_9$ fraction obtained as a by-product of the cracking of naphtha and the like is preferred from the industrial point of view.

The component (B) used in this invention is selected from the group consisting of drying oils, fatty acids and mixtures thereof.

The drying oils which may be used as the component (B) in this invention include vegetable and animal oils and fats having the iodine values of not less than 120, the particularly preferred being drying vegetable oils, such as linseed oil, tung oil, soy-bean oil and dehydrated castor oil. The boiled oils obtained by subjecting the aforementioned drying oils to thermal processing may be used.

The fatty acids which may be used as the component (B) in this invention include saturated or unsaturated synthetic fatty acids, such as myristic acid, palmitic acid, stearic acid, oleic acid, linoleic acid and linolenic acid, and fatty acids of natural origins, such as fatty acids of linseed oil and fatty acids of tall oil. Tall oil mainly composed of fatty acids may also be used as the component (B) of this invention.

A mixture of two or more of the aforementioned compounds may be used as the component (B).

In this invention, the resin (I) is prepared by reacting 100 parts by weight of the component (A) with 5 to 50 parts, preferably 10 to 40 parts, by weight of the component (B) in the presence or absence of a catalyst. When the reaction is carried out in the absence of a catalyst, the mixture of said components (A) and (B) is heated at 200° to 300° C. for 30 minutes to 15 hours, preferably 1 to 7 hours, to prepare the resin (I). When a catalyst is used, a Friedel-Crafts catalyst, such as boron trifluoride, complexes thereof with phenol, ether or acetic acid, or aluminium chloride, is added to a monomer mixture in an amount of 0.1 to 10 wt.%, preferably 0.3 to 2 wt.% based on the total weight of the monomers, and the mixture is reacted at a reaction temperature of from −(minus) 30° C. to 100° C., preferably 0 to 50° C., for a reaction time of from 10 minutes to 20 hours, preferably for 1 to 15 hours.

In order to obtain a final binder or vehicle resin having a particularly excellent solubility in a paraffin solvent, 5 to 100 parts, preferably 10 to 50 parts by weight of a straight-chain α-olefin may be included in addition to the component (B) based on 100 parts by weight of the component A. By the addition of an α-olefin, the solubility of the final binder or vehicle resin in a paraffin solvent is remarkably improved, whereby the printability of the printing ink containing the resin is also improved.

The preferable straight-chain α-olefins are those having 4 to 40 carbon atoms, the most preferred being those having 6 to 20 carbon atoms.

Commercially available pure products may be, of course, used as the straight-chain α-olefins. However, from the industrial point of view, it is recommended to use mixed α-olefins prepared by (1) the oligomerization of ethylene or (2) the thermal cracking of paraffin waxes.

By the oligomerization of ethylene as set forth by (1) above, straight-chain α-olefins having even numbers of carbon atoms are separated at high purity and no other isomers are contained in the separated product. By the thermal cracking of paraffin waxes as set forth by (2) above, α-olefins are produced at a purity of about 90%, the balance being branched chain olefins, diolefins and naphthene, and the product as such may be used in this invention without any inconvenience.

More specific examples of the α-olefins include 1-hexene, 1-heptene, 1-octene, 1-nonene, 1-dodecene, 1-tetradecene, 1-hexadecene, 1-octadecene, 1-eicosene and mixtures thereof. An olefin mixture produced by the process as set forth by (1) above is commercially available from Mitsubishi Kasei Co., Ltd. under the Trade Trade Name of Dialene, and a product produced by the process as set forth by (2) above is commercially available from Shevron Corporation under the Trade Name of Shevron α-Olefin. A mixture of two or more of the α-olefins described above may be used.

If the quantity of the component (B) used in the preparation of the resin (I) in this invention is less than the range mentioned above and defined in the claims, the advantageous effect obtained by the addition thereof does not reach the satisfactory level. On the contrary, if the quantity of the component (B) exceeds the defined range, the yield of the resin (I) is reduced considerably and the softening point of the resin is lowered.

According to this invention, the resin (I) prepared as aforementioned is allowed to react with the component (C) selected from the group consisting of unsaturated carboxylic acids, unsaturated carboxylic acid anhydrides and mixtures thereof. Preferable examples of the unsaturated carboxylic acids and anhydrides thereof which may be used in this invention include monohydric or polyhydric unsaturated carboxylic acids and anhydrides thereof having generally 3 to 32, more preferably 3 to 15, carbon atoms, the representative being acrylic acid, methacrylic acid, maleic acid, maleic acid anhydride, tetrahydrophthalic acid and anhydride thereof, fumaric acid, citraconic acid, itaconic acid and fatty acids of drying oils such as fatty acids of linseed oil and mixtures thereof. The most preferable are maleic acid and maleic acid anhydride.

The added ratio of the unsaturated carboxylic acid or anhydride thereof to the resin (I) is such that 1 to 15 parts, preferably 1 to 10 parts, by weight of the former is added to 100 parts by weight of the resin (I). If the quantity of unsaturated carboxylic acid or anhydride thereof is less than the range as mentioned above and defined in the claims, the formed resin is poorly improved as a resin having polar groups due to the lack of polar groups. When such a resin is used as the vehicle resin for printing ink, the dispersibility of pigments, the fluidity of the ink and the printability are unsatisfactory.

On the contrary, if the quantity of the unsaturated carboxylic acid or anhydride thereof is more than the defined range, the content of polar groups contained in the resultant resin becomes too high, leading to poor solubility in a solvent and disadvantageous tendency of color change or gellation of the resin. When such a resin is used in a printing ink, the solubility of the resin in a hydrocarbon solvent at the step of preparing an ink varnish is gotten poor to deteriorate the fluidity of the ink and the gloss of the printed matters disadvantageously. The aforementioned reaction for modifying the resin with an acid may be effected at a temperature of from 100° to 300° C., preferably 150° to 250° C., in the presence of a known radical reaction initiator, such as an organic peroxide, for 30 minutes to 15 hours, preferably 1 to 8 hours. If an unsaturated polycarboxylic acid or an anhydride thereof is used, it is preferred that the reaction be carried out without using a catalyst. If an unsaturated monocarboxylic acid or an anhydride thereof is used, it is preferred that the reaction be carried out in the presence of a catalyst.

The modified resin according to this invention and modified with an acid may be produced by the following one-step process.

An unsaturated carboxylic acid or an anhydride thereof may be added at the initial or intermediate stage of the step for thermally polymerizing the mixture of the components (A) and (B), and the admixture is thermally polymerized at a temperature of from 200° to 300° C. in the presence or absence of a solvent.

In this invention, the modified resin (II) modified with an acid may be esterified by the use of an alcohol to control the solubility and softening point of the resultant resin (II) or to control the molecular weight of the vehicle resin (III). The alcohols used for this purpose include monohydric or polyhydric alcohols. Monohydric alcohols having not less than 6 carbon atoms, preferably 8 to 18 carbon atoms, are particularly preferred to improve the solubility of the final binder or vehicle resin (III). The quantity of the alcohol should be such that the molar ratio of the carboxylic group to the alcohol group contained in the modified resin (II) is in the range of 1:0~1.0 and the molar ratio of the carboxylic acid anhydride group to the alcohol group contained in the modified resin (II) is in the range of 1:0~2.0. The esterification may be effected firstly by heating to melt the modified resin (II) modified with an acid or dissolving the same in a hydrocarbon solvent, such as benzene, toluene or xylene, followed by the addition of an alcohol, and reacting at 150° to 250° C. for 30 minutes to 10 hours, preferably 1 to 15 hours.

According to this invention, the modified resin (II) modified with an acid is further reacted with an alkyl substituted phenolic resin (component D) to obtain the intended binder or vehicle resin (III). The phenolic resins used in this invention include the condensation products of phenols including alkyl substituent groups having 4 to 9 carbon atoms with formalin. Specific examples of phenols which are preferred from the industrial point of view include p-tert-butylphenol, sec-butylphenol, p-tert-octylphenol and nonylphenol. Phenol resins prepared from phenols having no substituent group or cresols are not preferred, since the solubilities of the resultant binder or vehicle resins in high boiling point hydrocarbon solvents are poor. If a phenolic resin prepared from formalin and a phenol including a substitutent group having not less than 10 carbon atoms is used, the softening point of the resultant binder or vehicle resin is extremely lowered to a level unsuited for the printing ink.

Instead of reacting the modified resin (II) with a phenolic resin, formaldehyde and a phenol may be reacted in the presence of the modified resin (II) using an acid or alkali catalyst or without using a catalyst to obtain the intended binder or vehicle resin modified with a phenolic resin.

5 to 100 parts, preferably 10 to 50 parts, by weight of the modifier phenolic resin may be added to 100 parts by weight of the modified resin (II) modified with an acid. If the qauntity of the phenolic resin is less than the aforementioned range, the printing ink produced by using the resultant vehicle resin is unsatisfactory in fluidity and cannot give printed matters of satisfactory gloss. On the contrary, if the quantity of the phenolic resin exceeds the aforementioned range, the solubility of the resultant vehicle resin in a solvent for the printing ink is gotten poor and the cost is disadvantageously increased.

The resin (II) may be modified with a phenolic resin simply by mixing the resin (II) with the phenolic resin to obtain a mixture which is melted and heated at 150° to 250° C. for 30 minutes to 10 hours, preferably 1 to 5 hours. If necessary, an acid catalyst, such as oxalic acid, toluenesulfonic acid or a Friedel-Crafts catalyst, or an alkali catalyst, such as a metal oxide or metal hydroxide or ammonia, may be used.

It is desirous that the binder or vehicle resin (III) have a softening point of not lower than 100° C., preferably higher than 130° C. If the softening point of the vehicle resin (III) is lower than 100° C., the printing ink prepared therefrom is apt to suffer misting and blocking and the drying speed of the printing ink is extremely lowered.

It is desirous that the acid value of the vehicle resin (III) be 5 to 50, preferably 5 to 20. If the acid value of the resin (III) is lower than the aforementioned range, the printing ink prepared therefrom has a poor solubility. On the contrary, if the acid value of the resin (III) exceeds the aforementioned range, the solubility thereof in a paraffin solvent becomes poor and the offset printing ink prepared therefrom has a poor resistance to emulsification.

The offset printing ink of this invention may be prepared using the vehicle resin (III) modified with an acid and a phenolic resin, as described above, in accordance with a known method. For instance, 100 parts by weight of the vehicle resin (III) is dissolved at room temperature or under heating in a mixture composed of 50 to 200 parts by weight of a high boiling point hydrocarbon solvent and 10 to 100 parts, preferably 10 to 50 parts, by weight of a drying oil to prepare a varnish having a viscosity of 200 to 600 poises at room temperature. An ink composition according to this invention may be obtained by adding one or more pigments to the varnish and kneading by means of rollers or other kneaders.

The high boiling point hydrocarbon solvents which may be used in this invention should have the boiling points ranging from 200° to 350° C., preferably 250° to 330° C., and aromatic compound contents thereof should be not higher than 50 wt.%, preferably less than 30 wt.%.

According to this invention, high boiling point paraffin solvents having boiling points ranging within 200° to 350° C. and containing substantially no aromatic compound may be used. As the oily component for the drying oil and the like, long oil alkyd resins may also be used other than drying oils including linseed oil and tung oil.

EXAMPLES OF THE INVENTION

The present invention will be described more specifically with reference to some examples thereof. However, it should be appreciated here that the following examples are to be construed as illustrative only and the present invention is not limited only to the examples given below.

SYNTHESIS EXAMPLE 1

850 g of 97% dicyclopentadiene and 250 g of linseed oil were charged into an autoclave having a capacity of 2 liters, and heated at 260° C. for 3.5 hours in the nitrogen atmosphere under agitation. The autoclave was cooled after the completion of heating, and the content in the autoclave was distilled at 210° C./2 mmHg to remove the unreacted materials and oligomers. 920 g of a Resin (I-1) was left in the autoclave. The softening point of the Resin (I-1) was 136.5° C.

150 g of the Resin (I-1) was heated to 200° C. to melt the same, added with 4.5 g of maleic acid anhydride, and reacted for 4 hours under agitation to obtain a Modified Resin (II-1) modified with maleic acid anhydride. The softening point of the Modified Resin (II-1) was 147.0° C. and the acid value thereof was 13.5. Subsequently, 100 g of the Modified Resin (II-1) was added with 17.6g of a resol-type phenolic resin which had been prepared by the condensation reaction between p-tert-octylphenol and formalin, and reacted at 200° C. for 2 hours to obtain a Vehicle Resin (III-1) having a softening point of 169.5° C. and an acid value of 12.7.

SYNTHESIS EXAMPLE 2

800 g of 97% dicyclopentadiene and 200 g of tall oil were charged into an autoclave having a capacity of 2 liters, and reacted at 260° C. for 6 hours. The following procedures were similar to Synthetic Example 1 to obtain 925 g of a Resin (I-2). The softening point of the Resin (I-2) was 138.5° C.

150 g of the Resin (I-2) was heated to 200° C. to melt the same, added with 7.5 g of maleic acid anhydride, and reacted for 3 hours under agitation to obtain a Modified Resin (II-2) modified with maleic acid anhydride. The softening point of the Modified Resin (II-2) was 158.0° C. and the acid value thereof was 24.2. Subsequently, 100 g of the Modified Resin (II-2) was added with 4.2 g of decanol, and heated and agitated at 200° C. for one hour. Then, 20.2 g of a resol-type phenolic resin which had been prepared by the condensation reaction between p-nonylphenol and formalin was added, and reacted at 200° C. for 3 hours to obtain a Vehicle Resin (III-2) having a softening point of 160.5° C. and an acid value of 19.4.

SYNTHESIS EXAMPLE 3

800 g of 97% dicyclopentadien, 100 g of linseed oil and 100 g of 1-hexene were charged into an autoclave having a capacity of 2 liters, and reacted at 280° C. for 2 hours. The following procedures were similar to Synthesis Example 1 to obtain 932 g of a Resin (I-3) having a softening point of 146.0° C.

150 g of the Resin (I-3) was heated to 200° C. to melt the same, added with 4.5 g of maleic acid anhydride, and reacted for 3 hours under agitation to obtain a Modified Resin (II-3) modified with maleic acid anhydride. The softening point of the Modified Resin (II-3) was 155.0° C. and the acid value thereof was 13.7. Subsequently, 100 g of the Modified Resin (II-3) was added with 17.6 g of a resol-type phenolic resin which had been prepared by the condensation reaction between p-tert-octylphenol and formalin, and reacted at 200° C. for 2 hours to obtain a Vehicle Resin (III-3) having a softening point of 175.0° C. and an acid value of 12.2.

SYNTHESIS EXAMPLE 4

The by-product $C_5$ fraction (Boiling Point: 28°~60° C.) obtained at the step of producing ethylene and propylene through steam cracking of naphtha was heated at 120° C. for 4 hours and distilled to remove the unreacted $C_5$ fraction to obtain a mixture containing 85% of dicyclopentadiene and the reminder of codimers of cyclopentadiene with isoprene or piperylene. 850 g of this mixture containing 85% of dicyclopentadiene and 250 g of linseed oil were charged in an autoclave having a capacity of 2 liters, and reacted at 260° C. for 4 hours. The following procedures were similar to Synthesis Example 1 to obtain 872 g of a Resin (I-4) having a softening point of 137.0° C.

150 g of the Resin (I-4) was heated at 200° C. to melt the same, added with 5.3 g of maleic acid anhydride, and reacted for 4 hours under agitation to obtain a Modified Resin (II-4). The softening point of the Modified Resin (II-4) was 148.5° C. and the acid value thereof was 16.9. Subsequently, 100 g of the Modified Resin (II-4) was added with 3.0 g of 2-ethylhexanol, and heated and agitated at 200° C. for 2 hours. Then, 18.2 g of a resol-type phenolic resin which had been prepared by the condensation reaction between p-tert-octylphenol and formalin was added, and reacted at 200° C. for 2 hours to obtain a Vehicle Resin (III-4) having a softening point of 157.5° C. and an acid value of 14.1.

COMPARATIVE SYNTHESIS EXAMPLE 1

1000 g of 95% dicyclopentadiene and 400 g of xylene which acted as a solvent were charged into an autoclave having a capacity of 2 liters, and reacted at 260° C. for 3 hours. The following procedures were similar to Synthesis Example 1 to obtain 800 g of a Resin (I-a) having a softening point of 152.0° C.

150 g of the Resin (I-a) was heated at 200° C. to melt the same, added with 5.3 g of maleic acid anhydride, and reacted for 3 hours under agitation to obtain a Modified Resin (II-a). The softening point of the Modified Resin (II-a) was 165.0° C. and the acid value thereof was 16.5. Subsequently, 100 g of the Modified Resin (II-a) was added with 3.0 g of decanol, and heated and agitated at 200° C. Then, 18.2 g of a resol-type phenolic resin which had been prepared by the condensation reaction between p-tert-octylphenol and formalin was added, and reacted at 200° C. for 2 hours to obtain a Vehicle Resin (III-a) having a softening point of 170.5° C. and an acid value of 13.9.

COMPARATIVE SYNTHESIS EXAMPLE 2

100 g of the Resin (I-1) obtained in Synthesis Example 1 was heated to 200° C. to melt the same, and added with 17.6 g of a resol-type phenolic resin which had been prepared by the condensation reaction between p-tert-octylphenol and formalin. The mixture was heated and agitated at 200° C. for 2 hours to obtain a Vehicle Resin (III-b) having a softening point of 155.0° C.

Varnishes were prepared by using Vehicle Resin (III-1)~(III-4) and (III-a)~(III-b) obtained in Synthesis Examples 1~4 and Comparative Synthesis Examples 1 and 2 and also using the Modified Resin (II-1) and a control resin. Inks were prepared by using these varnishes, and the properties of the inks were tested. The test results are shown in the following Table under the captions of Examples 1~4 and Comparative Examples 1~4.

PREPARATION OF VARNISH 50 g of each of the vehicle resins was added with 20 g of linseed oil, and heated at 240° C. for 90 minutes. Then, an appropriate amount ranging within 20 to 40 g of a petroleum hydrocarbon solvent (NISSEKI Solvent No. 5; see Remark 1 given below) to control the viscosity of the resultant varnishes within the range of 500~600 poises.

Preparation of Ink:

Using each of the varnishes, an ink was prepared in accordance with the following prescription using a mixing roller assembly composed of three rollers.

Prescription of Ink:

| | |
|---|---|
| Pigment (Carmine 6B; see Remark 2 given below) | 14 grams |
| Varnish | 50 grams |
| Solvent (NISSEKI Solvent No. 5) | 5 grams |
| Wax Compound | 2 grams |
| Drier (Cobalt Naphthenate) | 0.3 grams |

Test Method and Test Result on the Properties of Ink:

Gloss:

0.4 cc of each ink was applied on art paper, using a RI Tester (see Remark 3 given below), and allowed to stand for 24 hours. The gloss of the dried ink was determined, using a 60 degrees-60 degrees glossmeter.

Setting Time:

0.4 cc of each ink was applied on a sheet of art paper, using the aforementioned RI Tester, and another blank sheet of art paper was overlaid on the inked face and pressed using the roller of the RI Tester. The interval of time from the time at which the ink was applied to the time at which the blank sheet of art paper was overlaid on the inked face was varied to find the interval of time required for the ink not to stick to the blank sheet of art paper.

Misting:

2.4 cc of each ink was put on the Inkometer (see Remark 4 given below) rotating at 1200 rpm. Scattering of ink on the art paper spread beneath the roller after the lapse of 3 minutes was observed.

Drying Time:

0.4 cc of each ink was applied on a sheet of art paper using the aforementioned RI Tester, and the time required for the ink to be dried was determined, using a tester for detecting the dryness of ink (see Remark 5 given below).

Emulsification Property of Ink:

Water was added to each of the prepared inks to emulsify the ink, and the fluidity of emulsified ink was determined. Offset printing inks are, in general, partially emulsified when they contact with water at the printing step. Only the inks which give emulsions having good fluidity can be applied for practical uses.

Control Resin:

A phenolic resin modified with rosin produced by Dainippon Ink & Chemical Co., Ltd. and commercially available under the Trade Name of Beckacite 1126HV.

Remark 1:

A solvent for ink having boiling points of 276°~311° C. and containing 23 wt.% of aromatic compounds, and produced by Nippon Oil Company Limited.

Remark 2:

Produced by Toyo Ink Mfg. Co., Ltd.

Remark 3:

A tester for testing printability and produced by Akira Seisakusho Co., Ltd.

Remark 4:

Produced by Toyo Seiki Co., Ltd.

Remark 5:

A tester produced by Toyo Seiki Co., Ltd.

TABLE

| | Used Resin | Viscosity of Varnish (poise, at 25° C.) | Gloss of the Printed Face | Setting Time (min.) | Drying Time (hr.) | Misting | Emulsification Property of Ink |
|---|---|---|---|---|---|---|---|
| Example 1 | III-1 | 570 | 61 | 6 | 3.0 | Not-observed | Good |
| Example 2 | III-2 | 550 | 62 | 6 | 3.0 | Not-observed | Good |
| Example 3 | III-3 | 560 | 66 | 8 | 3.0 | Not-observed | Good |
| Example 4 | III-4 | 520 | 62 | 6 | 3.0 | Not-observed | Good |
| Comp. Ex. 1 | III-a | 510 | 46 | 7 | 3.0 | Observed | Little Poor |
| Comp. Ex. 2 | III-b | 570 | 46 | 6 | 3.0 | Observed | Little Poor |
| Comp. Ex. 3 | II-1 | 590 | 44 | 10 | 4.5 | Observed | Poor |
| Comp. Ex. 4 | Control Resin | 550 | 57 | 6 | 3.0 | Not-observed | Little Poor |

Referring to Examples 1 to 4 shown in the Table, it should be clear that the offset printing ink compositions according to this invention are excellent in gloss and good in emulsification, misting, setting and drying properties.

In contrast thereto, an ink using a vehicle resin which contains neither a drying oil nor a fatty acid component is unsatisfactory in that the gloss of the printed face is poor with attendant misting and in that the emulsification property thereof is unsatisfactory, as will be clear from Compative Example 1 shown in the Table.

Comparative Example 2 is an exemplified ink composition prepared by using a resin which has not been modified with an acid, and shows that the gloss and emulsification property of such an ink are unsatisfactory and that the resin suffers misting.

In Comparative Example 3, a resin which has not been modified with a phenolic resin is used. This Comparative Example shows that an ink prepared by using such a resin is unsatisfactory in gloss, setting, drying and emulsification properties and suffers misting.

In comparative Example 4, an ink is prepared by using a known control resin commonly used in the art. This known resin is a phenolic resin modified with rosin. It will be understood by comparing the examples of this invention with this Comparative Example that the gloss and emulsification property the offset printing ink compositions according to this invention are improved over these of the conventional ink composition prepared by using the known phenolic resin modified with rosin.

Although the present invention has been described with particular reference to preferred embodiments, it will be apparent to those skilled in the art that variations and modifications may be made without departing from the essential spirit and scope of the invention. It is intended to include all such variations and modifications.

What is claimed is:

1. An offset printing ink composition containing a vehicle resin (III) prepared by reacting 5 to 100 parts by weight of a phenolic resin (component D) with 100 parts by weight of a modified resin (II) modified with an acid, said phenolic resin (component D) being prepared by the condensation of a phenol including an alkyl substituent group having 4 to 9 carbon atoms with formalin, said modified resin (II) modified with an acid being prepared by reacting 1 to 15 parts by weight of a component C selected from the group consisting of unsaturated carboxylic acids, unsaturated carboxylic acid anhydrides and mixtures thereof with 100 parts by weight of a resin (I) obtained by thermally copolymerizing at a temperature of from 200° C. to 300° C. 5 to 50 parts by weight of a component B selected from the group consisting of drying oils, fatty acids and mixtures thereof with 100 parts by weight of a five-member cyclic compound (component A) having a conjugated double bond or bonds and represented by the general formula of:

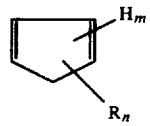

(wherein H is hydrogen; R is an alkyl group having 1 to 3 carbon atoms; m and n are zero or integers of not less than 1 and are in the relation of $m+n=6$) and a Diels-Alder addition product thereof.

2. An offset printing ink composition according to claim 1, wherein said five-member cyclic compound and said Diels-Alder addition product thereof (component A) is selected from the group consisting of cyclopentadiene, methylcyclopentadiene, dicyclopentadiene, cyclopentadienemethylcyclopentadiene codimer, tricyclopentadiene and mixtures thereof.

3. An offset printing ink composition according to claim 1, wherein said five-member cyclic compound and said Diels-Alder addition product thereof (component A) is a concentrated distillate obtained by removing the major part of $C_5$-fractions from a mixture prepared by the thermal dimerization of cyclopentadiene and methylcyclopentadiene contained in the $C_5$-fractions of by-product cracked oils obtained by thermally cracking naphtha or the like at a high temperature.

4. An offset printing ink composition according to claim 1, wherein said five-member cyclic compound and said Diels-Alder addition product thereof (component A) contains an unsaturated aromatic compound in an amount not more than the amount of said five-member cyclic compound and said Diels-Alder addition product thereof.

5. An offset printing ink composition according to claim 1, wherein said drying oil has an iodine value of not less than 120 and is selected from the group consisting of vegetable oils and fats, animal oils and fats and mixtures thereof.

6. An offset printing ink composition according to claim 5, wherein said vegetable oil is selected from the group consisting of linseed oil, tung oil, soy-bean oil, dehydrated castor oil, boiled linseed oil, boiled tung oil, boiled soy-bean oil, boiled dehydrated castor oil and mixtures thereof.

7. An offset printing ink composition according to claim 1, wherein said fatty acid is selected from the group consisting of myristic acid, palmitic acid, stearic acid, oleic acid, linoleic acid, linolenic acid, fatty acids of linseed oil, fatty acids of tall oil, tall oil mainly composed of fatty acids and mixtures thereof.

8. An offset printing ink composition according to claim 1, wherein said component C is selected from the group consisting of acrylic acid, methacrylic acid, maleic acid, maleic acid anhydride, tetrahydrophthalic acid and anhydride thereof, fumaric acid, citraconic acid, itaconic acid, fatty acids of drying oils and mixtures thereof.

9. An offset printing ink composition according to claim 1, wherein said resin (II) modified with an acid is esterified with a monohydric or polyhydric alcohol.

10. An offset printing ink composition according to claim 1, wherein said phenol is selected from the group consisting of p-tert-butylphenol, sec-butylphenol, p-tert-octylphenol, nonylphenol and mixtures thereof.

11. An offset printing ink composition according to claim 1, further comprising 50 to 200 parts by weight of a hydrocarbon solvent having a boiling point of from 200° to 350° C., and 10 to 100 parts by weight of a drying oil, the content of an aromatic compound in said hydrocarbon solvent being 50% by weight or less.

12. An offset printing ink composition according to claim 11, wherein said hydrocarbon solvent is a paraffin solvent.

13. An offset printing ink composition according to claim 1, further comprising 5 to 100 parts by weight of a straight-chain α-olefin based on 100 parts by weight of said component A in addition to said component B.

14. An offset printing ink composition according to claim 13, wherein said straight-chain α-olefin has 4 to 40 carbon atoms.

15. An offset printing ink composition according to claim 14, wherein said straight-chain α-olefin is selected from the group consisting of 1-hexene, 1-heptene, 1-octene, 1-nonene, 1-dodecene, 1-tetradecene, 1-hexadecene, 1-octadecene, 1-eicosene and mixtures thereof.

* * * * *